United States Patent
Zhao et al.

(10) Patent No.: US 10,469,667 B2
(45) Date of Patent: Nov. 5, 2019

(54) CONFERENCING SYSTEM INCLUDING A REMOTE MICROPHONE AND METHOD OF USING THE SAME

(71) Applicants: Zibo Zhao, Kanata (CA); Anjie Wu, Kanata (CA)

(72) Inventors: Zibo Zhao, Kanata (CA); Anjie Wu, Kanata (CA)

(73) Assignee: MITEL NETWORKS CORPORATION, Ottawa, Ontario (CA)

( * ) Notice: Subject to any disclaimer, the term of this patent is extended or adjusted under 35 U.S.C. 154(b) by 498 days.

(21) Appl. No.: 14/154,374

(22) Filed: Jan. 14, 2014

(65) Prior Publication Data
US 2015/0201082 A1 Jul. 16, 2015

(51) Int. Cl.
H04M 3/56 (2006.01)
H04L 12/18 (2006.01)
H04L 29/06 (2006.01)

(52) U.S. Cl.
CPC ........ *H04M 3/561* (2013.01); *H04L 12/1822* (2013.01); *H04L 12/1827* (2013.01); *H04L 65/4038* (2013.01); *H04L 65/80* (2013.01)

(58) Field of Classification Search
CPC .................................................... H04M 3/561
See application file for complete search history.

(56) References Cited

U.S. PATENT DOCUMENTS

| | | | | |
|---|---|---|---|---|
| 6,816,469 B1 * | 11/2004 | Kung | ................... | H04Q 3/0016 370/260 |
| 6,892,230 B1 * | 5/2005 | Gu | ...................... | H04L 12/2805 370/254 |
| 7,617,094 B2 * | 11/2009 | Aoki | ..................... | H04M 3/564 370/260 |
| 7,742,587 B2 * | 6/2010 | Cohen | .................... | H04L 29/06 379/158 |
| 8,095,120 B1 * | 1/2012 | Blair | .................... | H04M 3/562 379/202.01 |
| 8,787,213 B2 * | 7/2014 | Cai | ......................... | H04L 12/66 370/262 |
| 9,253,331 B2 * | 2/2016 | Koenig | ................. | H04M 3/563 |
| 2004/0196867 A1 * | 10/2004 | Ejzak | ..................... | H04M 3/56 370/468 |
| 2012/0281596 A1 * | 11/2012 | Danielsen | .......... | H04L 67/2804 370/261 |

* cited by examiner

*Primary Examiner* — Joseph T Phan

(57) ABSTRACT

A conferencing system and method are disclosed. An exemplary system includes a conference device and one or more user devices. The conference device is configured to receive audio information from one or more user devices. The audio information received by the conference device can be mixed with audio information received by conference device microphones.

18 Claims, 3 Drawing Sheets

CONFERENCING SYSTEM INCLUDING A REMOTE MICROPHONE AND METHOD OF USING THE SAME

FIELD OF THE INVENTION

The present disclosure generally relates to electronic communication systems and methods. More particularly, exemplary embodiments of the disclosure relate to conferencing systems, such as videoconferencing and audio conferencing systems that include a remote microphone and methods of using the systems.

BACKGROUND OF THE INVENTION

Conferencing systems, such as videoconferencing and audio conferencing systems (e.g., teleconferencing systems) often include a conference device that includes one or more microphones and a speaker to allow one or more conference participants near the conference device to participate in a conference using the conference device. One or more participants that are away from or remote from the conference device—e.g., not in the same room as the conference device—can use remote conference devices, telephones and/or other devices to connect the remote participants to the conference device using a mixer functionality in the conference device.

As a number of participants using the same conference device (e.g., conference participants in the same room) increases, a distance that at least some participants reside from the conference device generally increases. And, as the distance between participants using the conference device and the conference device increases, it can become increasingly difficult for remote participants to hear participants using the conference device that are a greater distance from the communication device. Moreover, an apparent volume of participants' voices sharing the conference unit to the remote participant(s) can vary according to a distance each local participant is to the conference device.

To address this issue, local participants using the conference device may get up and move closer to the conference device during a conference, move the conference device closer to one or more participants, or speak louder. Such activities may need to be repeated for one or more of the local conference participants. And, either activity may cause unwanted noise or disruption during a conference.

Another technique to address this problem includes use of satellite microphones that are connected to the conference device—e.g., using either wired or wireless (e.g., Bluetooth or Digital Enhanced Cordless Telecommunications (DECT)) technology. However, even with the additional microphones, one or more participants may have to get up and move closer to a microphone or have a microphone moved closer to the participant during a conference. Moreover, this solution increases costs of the conference device associated with the additional satellite microphones.

Yet another technique to address this problem is to have a participant use a remote device to connect to the conference device. For example a participant in the same room as the conference device and other participants may choose to dial in to the conference—using the same techniques remote participants use to dial in to the conference. While this solution addresses the need for participants to move closer to a microphone on or connected to the conference device or to have a microphone moved closer to the participant, the technique also has several disadvantages. When a participant near the conference device connects to the conference, the participant's voice is repeated over the conference device speakers, which because of transmission delays can result in an echoing of the participant's voice to the participant that called in to the conference and to other participants near the conference device. In addition, when a participant uses a remote device, such as a mobile phone to call in to the conference, the mobile phone or other device shows as busy or in use, so the participant may not be able to make or receive additional calls.

Accordingly, improved systems and methods for conferencing using a remote microphone are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The disclosure describes exemplary conferencing systems and methods. Although exemplary systems and methods are conveniently described herein in the context of audio conferencing, systems and methods of the present disclosure can also be used for other types of conferencing, including videoconferencing and web conferencing.

As set forth in more detail below, exemplary systems and methods described herein are advantageous over other conferencing systems and methods, because the systems and methods of the present disclosure allow multiple participants to use a single conference device, without having to get up and move to get close to a microphone(s) of the conference device, without having to increase the volume of his or her voice, and without having to use a mobile device to separately call in to the conference session. Exemplary systems and methods employ a microphone of a participant's device to capture and facilitate transmission of audio information from the participant's device to a conference unit. The microphone on the participant's device can act as a satellite microphone of the conference device and audio information from one or more participants' devices can be mixed with audio information received by the conference device. Because the systems as described herein employ microphones, for example, in devices that participants can bring to a meeting, exemplary systems of the disclosure are relatively low cost, flexible, and portable.

Figure 1:
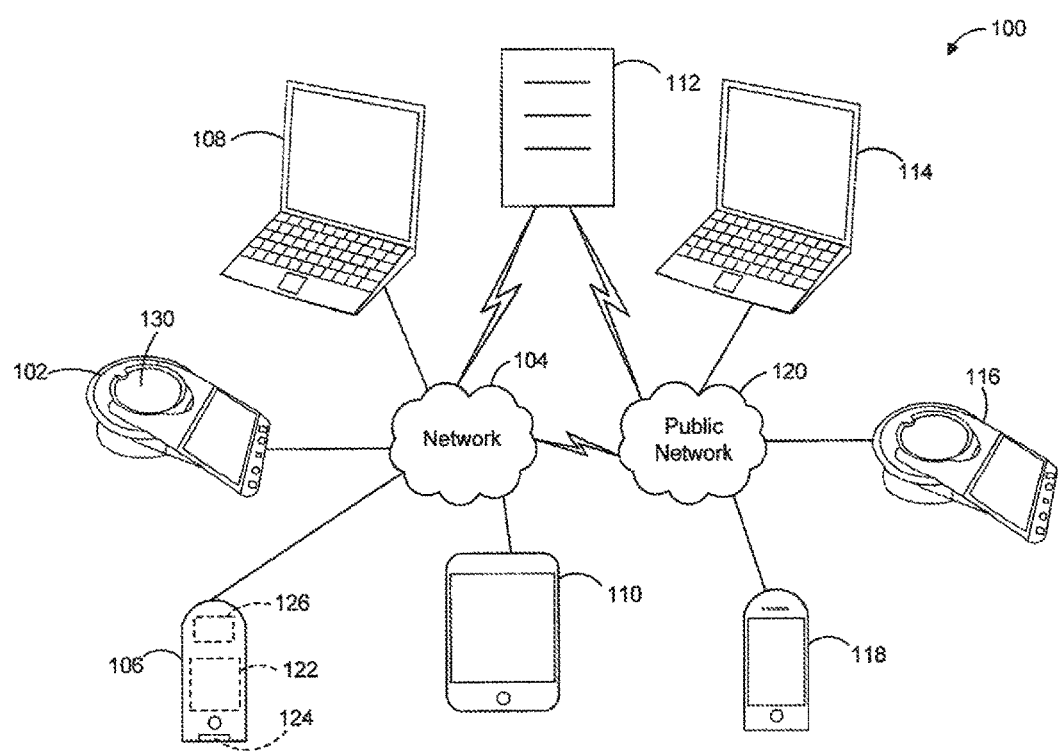
FIG. 1 illustrates a conferencing system in accordance with exemplary embodiments of the disclosure.

FIG. 1 illustrates a conferencing system 100 in accordance with various exemplary embodiments of the invention. System 100 includes a conference device 102, a local network 104, one or more user devices 106, 108, 110 coupled to conference device 102 via network 104, optionally a server 112 and optionally one or more additional user devices 114, 116, 118, coupled to network 104—either directly, through a public network 120, or though server 112.

Conference device 102 can include an audio conference device, such as a teleconferencing phone, a video conferencing device, or a collaboration appliance. In general conference device 102 can be used to conduct a conference and to allow one or more participants of a conference to use conference device 102 to participate in the conference. As set forth in more detail below, during a conference, conference device 102 receives audio information from one or more user devices 106-110, decodes the audio information (if the information is encoded), and optionally mixes the audio information received from one or more user devices with audio information received on one or more speakers of conference device 102. Conference device 102 can also cancel any echo that would otherwise result from audio information received from one or more user devices 106-110. In accordance with various aspects of these embodiments, conference device 102 includes a visual display 130, which displays an indication of user devices connected to conference device 102. For example, display 130 can indicate a number of user devices coupled to conference device 102 and/or participant information (e.g., name, organization, position, etc.) associated with one or more participants associated with a user device connected to conference device 102.

Networks 104 and 120 can include a local area network (LAN), a wide area network, a personal area network, a campus area network, a metropolitan area network, a global area network, or the like. Networks 104, 120 can be coupled to one or more devices 102, 106-110, 114, 118 using an Ethernet connection, other wired connections, a WiFi interface, other wireless interfaces, or the like. Networks 104, 120 can be coupled to other networks and/or to other devices.

In the illustrated example, user devices 106, 108, and 110 are respectively illustrated as a mobile phone, a laptop, and a tablet. However, user devices, such as user devices 106-110 can be any suitable device, including mobile phones, smart phones, table computers, laptop computers, desktop computers, game consoles, cordless phones, or the like.

In general, a user device, such as devices 106-110, includes a user client 122, a user device microphone 124, and a user device processor 126. Client 122, user device microphone 124, and user device processor 126 of user device 106 can be used to transmit voice information to conference device 102, and optionally on to server 112.

User client 122 is software that can be used to facilitate a direct connection between device 106 and conference device 102, without using server 112. As described in more detail below, user client 122 can be used to initiate authentication between a user device and conference device 102. User client 122 can also facilitate capturing a participant's audio information (e.g., voice information) using microphone 124 on a user device, encoding the audio information, and transmitting the audio information. User client 122 can also optionally include various options, including "mute," "push to talk," and microphone volume control.

User device processor 126 can perform several functions, such as authentication, encoding audio information, opening various communication ports, transmitting audio information, and the like. Although the term "processor" as used herein is singular, a processor, such as user device processor and other processors referred to herein can include several cores and/or multiple processors, and can be configured to perform one or more of the functions and tasks as described herein.

Various techniques can be used to couple a user device (e.g. device 106) to conference device 102. For example, virtual connections, such as internet protocol (IP) connections, such as voice over internet (VOIP) protocols, such as real-time transport protocol (RTP) or Secure Real-time Transport Protocol (SRTP) can be used to connect conference device 102 and user device 106.

Figure 2:
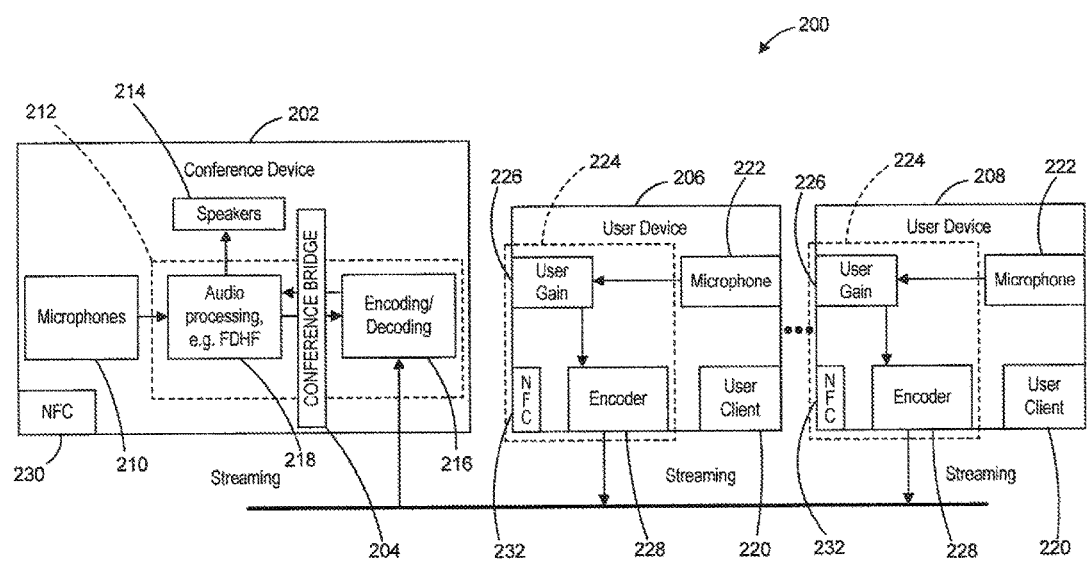
FIG. 2 illustrates a portion of a conferencing system in accordance with exemplary embodiments of the disclosure.

FIG. 2 illustrates a conferencing system 200 that uses an IP connection to connect one or more user devices to a conference device. Conferencing system 200 includes a conference device 202, including a conference bridge 204, and user devices 206, 208. Device 202 can be the same or similar to device 102, and devices 206, 208 can be the same or similar to any of devices 106-110, 114-118. Although illustrated with only two devices 206, 208, systems in accordance with the present disclosure can include any suitable number of user devices. Further, although system 200 is illustrated with a conference device including a conference bridge, alternative systems in accordance with the present disclosure can additionally or alternatively include a conference bridge or server that is separate from the conference device.

Conference device 202 includes one or more conference device microphones 210 to receive audio information during a conference (e.g. audio information from one or more participants near conference device 202), a conference device processor 212 to process audio information, conference bridge 204, and speakers 214.

Conference device 202 can include any suitable number of microphones, an array of microphones, one or more or an array of directional microphones, a beamformer, or any combination thereof.

In the illustrated example, conference device processor 212 includes an encoder/decoder 216 to receive audio information (e.g., encoded audio information) from one or more user devices 206, 208 and to decode the encoded audio information. The decoded audio information from devices 206 and 208 can be mixed using conference bridge 204. The mixed audio information can then transmitted to audio processor 218 and then transmitted to speakers 214. Encoding/decoding device 216 can also receive audio information (e.g., mixed audio information including audio information from one or more microphones 210 of conference device 202 and/or one or more user devices 206, 208, and encode the information for transmission.

User devices 206, 208 include a user client 220, a microphone 222, and a user device processor 224, which includes an optional adjustable gain device 226 and an encoder 228. Microphone 222 can be any suitable microphone or an array of microphones typically used in, for example, mobile devices. Encoder 228 can be any suitable encoder that can encode electronic audio information for transmission to conference device 202. For example, encoder 228 can encode audio information using H.323, Media Gateway Control Protocol (MGCP), Session Initiation Protocol (SIP), Media Gateway Control or H.248 (Megaco), Real-time Transport Protocol (RTP), Real-time Transport Control Protocol (RTCP), Secure Real-time Transport Protocol (SRTP), Session Description Protocol (SDP), Inter-Asterisk eXchange (IAX), Jingle XMPP VoIP extensions, Skype® protocol, Teamspeak, or the like. In the case of an SIP connection, a special address, which is different from the conference device address, is used to form a connection between a user device and the conference device.

During operation of system 200, audio information is transmitted from user devices 206, 208 to conference device 202. In accordance with various embodiments of the disclosure, system 200 can require authentication prior to conference device 202 receiving audio information from one or more devices 206, 208. In these cases, authentication can be conducted using, for example, near field communication (NFC) techniques, Infrared Data Association (IrDA), authenticated Bluetooth® technology, Username and Password, or similar techniques. In the case of NFC connections, a user device 206 and conference device respectively include an NFC sensor, illustrated as conference device NFC device 230 and user device NFC device 232. In the case of Username and Password, user client 220 can be configured to request a user to input and to receive the desired conference login information.

Figure 3:
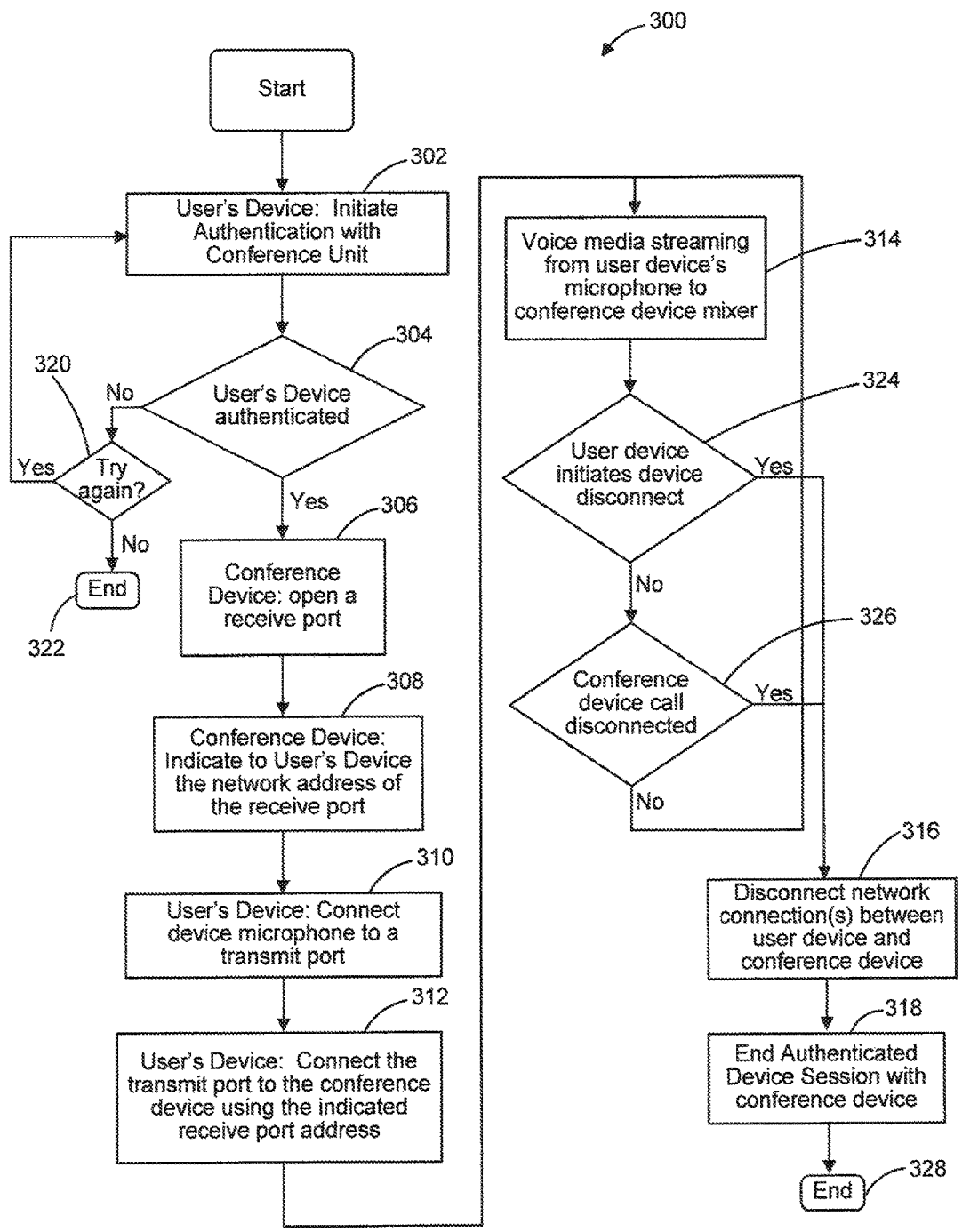
FIG. 3 illustrates a conferencing method in accordance with further exemplary embodiments of the disclosure.

Turning now to FIG. 3, a conferencing method 300, e.g., for use of conferencing system 100 or conferencing system 200, is illustrated. In general, a conferencing method, such as conferencing method 300, includes providing a user device that includes a microphone and a user client as described herein, providing a conference device, including a speaker, optionally providing a server, establishing a connection between one or more user devices and the conference device, and streaming audio information directly between one or more user devices and the conference devices. A method such as method 300 can be initiated using a conference device or using a user device (e.g., using a client on the user device).

FIG. 3 illustrates one example of performing a method in accordance with various exemplary embodiments of the invention. Exemplary conferencing method 300 includes establishing a connection between a user device and a conference device, which includes the steps of initiating authentication (step 302), verifying authentication (step 304), opening up a receive port on a microphone mixer (step 306), transmitting a network address associated with the conference device to a user device (step 308), connecting a user device microphone to a transmit port of a user device (step 310), and connecting the transmit port of a user device to a receive port on the conference device (step 312). Method 300 also includes streaming voice information from the user device to the conference device (step 314), disconnecting the network connection(s) (step 316), and ending the authenticated session (step 318).

During step 302, a user device (e.g., using a user client) initiates an authentication process with a conference device. This allows ad hoc connections of user devices to a conference device. As noted above, any suitable authentication technique can be used. For example, NFC protocols can be used. In this case, an NFC-enabled user device is placed adjacent or proximate (e.g., within about four cm or less) an NFC-enabled conference device. Alternatively, username and password, SIP, or other authentication techniques can be used. A type of authentication can depend on a type of user device. For example, NFC authentication can be used with NFC enabled user devices, whereas username and password authentication may be more desirable for larger devices, such as laptop and desktop computers.

During step 304, a determination is made (e.g., by the conference device) whether a user device is authenticated. If the user device is not authenticated, a determination (step 320) can be made whether to try again or not. If authentication is not retried, method 300 ends (step 322).

At step 306, a conference device opens a receive port—e.g., on processor (e.g., processor 212) or a microphone mixer (e.g., audio processing device 218). The conference device then transmits a network address of the receive port to a user device at step 308.

During step 310, a user device connects a microphone output to a transmit port of the user device (e.g., using processor 224). Although this step is illustrated as occurring after step 308, step 310 can occur at any suitable stage, such as after step 302.

Once a user device receives a network address of the receive port of the conference device at step 308, a transmit port of the user device connects to the conference unit at step 312 using the port address provided during step 308.

After the user device and the conference device are connected, voice information (e.g., encoded voice information) is transmitted from the user device to the conference device during step 314.

At step 324, a user device determines whether to disconnect from the conference and at step 326, a conference device determines whether to disconnect from the conference. Step 324 and 326 can be performed at any time after step 312.

If or when it is determined by a user device or a conference device to disconnect from a conference, the connection is terminated at step 316 and an authenticated session between the user device and the conference device is terminated and method 300 ends (step 328). The streaming can be discontinued if a user initiates disconnect, e.g., using a user client, or if the conference unit initiates disconnect. In the latter case, a conference unit can be configured to disconnect particular user devices or to disconnect all user devices at one time. By way of example, a conference device can unconditionally disconnect all user devices when the conference unit becomes idle—e.g., when connection(s) to all user devices or to the conference device are cleared.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A conferencing system comprising:
   a conference device comprising a conference device processor, a plurality of conference device microphones, and a plurality of speakers; and
   a user device comprising a user device processor, a user client, and a user device microphone, wherein the user device processor encodes audio information for transmission to the conference device, and
   wherein the user device is directly coupled to the conference device using a virtual connection, wherein the conference device processor is configured to decode audio information received from the user device, mix decoded audio information with audio information received from the plurality of conference device microphones, and cancel an echo from audio information received from the user device, wherein mixed decoded audio information and audio information received from the plurality of conference device microphones is transmitted to the plurality of speakers, and wherein the user device directly streams encoded audio information to the conference device, without an intervening server.

2. The conferencing system of claim 1, wherein the plurality of speakers includes an array of speakers.

3. The conferencing system of claim 1, wherein the virtual connection is an internet protocol connection.

4. The conferencing system of claim 1, wherein the user device encodes the audio information into VoIP packets.

5. The conferencing system of claim 4, wherein the user device encodes the audio information into RTP packets.

6. The conferencing system of claim 1, wherein the user device processor comprises an adjustable gain device.

7. The conferencing system of claim 1, further comprising a server coupled to the conference device.

8. The conferencing system of claim 1, wherein the conference device mixes audio information from a plurality of user devices.

9. The conferencing system of claim 1, wherein the user client initiates an authentication process between the conference device and the user device.

10. A conferencing method comprising the steps of:
establishing a direct connection, without an intervening server, between a user device and a conference device having a plurality of conference device microphones, a processor, and a plurality of speakers;
streaming encoded audio information using a virtual connection between the user device and the conference device;
decoding audio information received from the user device;
mixing decoded audio information with audio information received from the plurality of conference device microphones;
cancelling an echo from audio information received from the user device; and
using the processor, transmitting decoded audio information and audio information received from the plurality of conference device microphones to the plurality of speakers.

11. The conferencing method of claim 10, wherein the step of establishing a connection comprises the user device initiating an authentication process with the conference device.

12. The conferencing method of claim 11, wherein the authentication process comprises NFC authentication.

13. The conferencing method of claim 10, wherein the step of establishing a connection comprises verifying authentication of the user device.

14. The conferencing method of claim 10, wherein the step of establishing a connection comprises opening up a receive port on the conference device.

15. The conferencing method of claim 10, wherein the step of establishing a connection comprises transmitting a network address associated with the conference device to the user device.

16. The conferencing method of claim 10, wherein the step of establishing a connection comprises using a user client to connect a user device microphone to a transmit port of the user device.

17. The conferencing method of claim 10, wherein the step of establishing a connection comprises connecting the transmit port of the user device to a receive port on the conference device.

18. A conferencing system comprising:
a conference device comprising a conference bridge, a processor, a plurality of conference device microphones, and a plurality of speakers; and
a user device comprising a user device processor, a user client, and a user device microphone,
wherein the user device processor encodes audio information for direct transmission to the conference device, without use of an intervening server, and
wherein the conference device receives and decodes the audio information, mixes decoded audio information with audio information received from the plurality of conference device microphones, cancels an echo from audio information received from the user device, and transmits mixed decoded audio information and audio information received from the plurality of conference device microphones to the plurality of speakers.

* * * * *